3,457,299
PROCESS FOR PREPARING CARBOXYLATES FROM OLEFIN HALIDES AND CARBON MONOXIDE
Rex D. Closson, Casey, Ill., and Kryn G. Ihrman, Farmington, Mich., assignors to Ethyl Corporation, New York, N.Y., a corporation of Virginia
No Drawing. Continuation-in-part of application Ser. No. 401,252, Oct. 2, 1964. This application Mar. 28, 1968, Ser. No. 717,031
Int. Cl. C07c 67/00, 51/14, 57/00
U.S. Cl. 260—486                                    11 Claims

ABSTRACT OF THE DISCLOSURE

A process is described for preparing unsaturated carboxylic acids and related compounds by reacting a halogenated olefin and carbon monoxide, using as a catalyst rhodium, iridium, platinum, palladium osmium and ruthenium metal or mixtures thereof.

Use of acetylene for this purpose is also described.

---

This application is a continuation-in-part of co-pending application Ser. No. 401,252, filed Oct. 2, 1964, now abandoned.

This invention relates to a novel process for the preparation of unsaturated carboxylic acids and related compounds. More specifically, it relates to a catalytic process for the preparation of acids and related compounds from halogenated olefins and carbon monoxide. The catalysts employed in this process are the Group VIII metals and mixtures of said metals.

An object of this invention is to provide a process for the preparation of carboxylic acids and related compounds. A particular object is to provide a catalytic process for the preparation of unsaturated carboxylic acid esters. Additional objects will be apparent from the following detailed description and appended claims.

The objects of this invention are accomplished by providing a process which comprises reacting a halogenated olefin with carbon monoxide in the presence of a catalytic amount of a catalyst selected from the Group VIII metals of the Periodic Table and mixtures thereof. A preferred embodiment of this invention comprises a catalytic process for the preparation of unsaturated carboxylic acid esters, acids, and the like, which comprise reacting a halogenated olefin having the formula

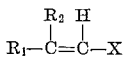

wherein X is a halogen and $R_1$ and $R_2$ are selected from the group consisting of hydrogen and univalent organic radicals having one to about 28 carbon atoms, said organic radicals being selected from the group consisting of alkyl, cycloalkyl, and aryl radicals, such that at least one of $R_1$ and $R_2$ is hydrogen and said olefin has up to about 30 carbon atoms; said process being carried out in the presence of a catalytic quantity of a catalyst selected from the group consisting of the metals palladium, platinum, iridium, and rhodium, and mixtures thereof.

An outstanding feature of this process is the products produced thereby. The products contain an olefinic double bond and a carboxyl function. Both of these functional groups are highly reactive and capable of a wide variety of chemical reactions. The technical importance of bifunctional compounds of this type maintains a continuing interest in new and improved methods for their preparation.

The process of this invention is characterized by its decided economical advantages and its simplicity. The reactants are comparatively inexpensive and readily obtainable. Furthermore, the catalysts employed are stable and relatively non-toxic; hence, they can be stored and used without elaborate safety precautions. Moreover, the process is readily carried out in standard reaction vessels. An important aspect of this invention is that it requires considerably less than a molar equivalent quantity of catalyst. Moreover, the catalytic activity is not destroyed by the process; therefore, the catalysts are reusable. The catalysts are solids and can be dispersed on an inert matrix. Thus, the process can be carried out as a continuous flow operation.

An unsaturated carboxylic acid or related compound is prepared by the process. For example, if the reaction is carried out in the presence of water or alcohol, the corresponding carboxylic acid or an ester thereof is prepared. Other procedures for altering the product produced are apparent to one skilled in the art. Hence, this invention comprises: In a process for the preparation of unsaturated carboxylic acids, esters, and the like, the step comprising reacting a halogenated olefin with carbon monoxide, in the presence of a catalyst. This step can be illustrated by the following equation depicting a preferred embodiment wherein the halogenated olefin is vinyl chloride and [cat.] represents a catalytic amount of a material selected from the group consisting of the metals palladium, platinum, iridium, rhodium and mixtures thereof.

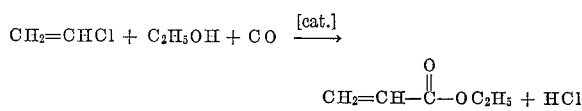

As illustrated by the equation, one molecule of carbon monoxide is inserted into each halogenated olefin group reactant. Although the process can be carried out by contacting the reactant in this ratio, it is not necessary to do so. Frequently it is desirable to employ an excess of either reactant. The amount of excess is not critical and is governed to some extent by the cost of the olefin, the solubility of carbon monoxide therein, equipment design, and ease of separation of the desired product. Thus, up to 30 or 40 or more moles of halogenated olefin per mole of carbon monoxide can be employed if desired.

An excess of carbon monoxide frequently increases the yield. Consequently, it is frequently desirable to employ from about 1.5 to about 25 or more moles of carbon monoxide per each mole of halogenated olefin to be reacted. A preferred excess is from about 2 to about 15 moles, and a most preferred ratio from about 3 to about 12 moles of carbon monoxide per each mole of halogenated olefin.

The process can be carried out in the presence of inert ingredients. For example, it can be carried out in the presence of a liquid reaction medium and/or dispersing medium which does not enter into the reaction. The liquid reaction medium is an inert organic liquid such as hydrocarbon or mixtures thereof. Hydrocarbons which can be employed can be either aliphatic, alicyclic, or aromatic. Typical applicable liquid reaction media are cyclohexane, benzene, toluene, isooctane, xylene, mesitylene, ether, kerosene, No. 9 oil, and the like.

The process of the present invention is carried out in a reactive liquid reaction media; that is, in a reaction media which enters into the reaction with the carbonyl group. The liquid reaction media which may be used are, for example, alcohols and organic amines which would yield, respectively, esters and amides. Any alcohol that has a reactive hydroxyl group attached to an inert organic radical (inert as far as this process is concerned) may be used since it is the hydroxyl group which enters into the reaction. Alcohols having one to 20 carbon atoms or more may be employed; for example, paraffinic alcohols, phenols, and cycloparaffinic alcohols. The preferred alcohols are ethanol, propanol, butanol, phenyl, cresol, xylenol, naphthol, cyclopentanol, and cyclohexanol. Similarly, polyols such as diols and triols may also be used; for example, ethylene glycol and glycerol. It is preferred that the alcohols have no unsaturation because under some conditions such alcohols yield extraneous products. Examples of such undesirable alcohols are butene diols and acetylenic alcohols. Any aliphatic or aromatic amine may be used as the liquid reaction media; for example, diethylamine, triethylamine, propylamine, amylamine, ethylenediamine, triethylenediamine, ethanolamine, aniline, methylaniline, toluidine, phenylenediamine, and the like.

When the reaction is carried out in the presence of water, an ethylenically unsaturated carboxylic acid is obtained. It should be understood that the process of this invention can also be carried out in a liquid medium containing a mixture of two or more of the solvents listed above, yielding a free acid, related compounds or mixtures, depending on the composition of the liquid reaction medium.

A temperature which affords a reasonable reaction time and which does not cause an excessive decomposition of the products or reactants is preferred. A preferred temperature range is from about 250° C. to the decomposition temperature of the halogenated olefin, and the most preferred range is from about 260° to about 290° C.

The process of this invention generally is carried out under superatmospheric pressures. A readily obtainable pressure which affords a reasonable yield of product in a comparatively short reaction time is preferred. In many instances, best results are obtained when the reaction is carried out at pressures within the range of from about 50 p.s.i. to about 10,000 p.s.i. A preferred pressure range is from about 600 p.s.i. to about 7000 p.s.i, and a highly preferred range is from about 2000 to about 5000 p.s.i.

A preferred embodiment of this invention is the process for the preparation of an ethyl ester of an unsaturated carboxylic acid, said process comprising reacting carbon monoxide under pressure, with vinyl chloride, said process being carried out in at least a stoichiometric quantity of ethyl alcohol and in the presence of a catalytic amount of palladium on charcoal; wherein the pressure of carbon monoxide is at least 100 p.s.i. before the reaction temperature is attained, and thereafter, the pressure being raised to within the range of from about 2000 p.s.i. to about 5000 p.s.i., the reaction temperature being in the range of from about 270° C. to 290° C. It has been found that the impression of at least 100 p.s.i. of carbon monoxide before the reaction temperature is reached tends to increase the yield of product. Similarly, this expedient can be employed to increase the product yield when reacting other olefinic halides or when other reaction media or catalysts, or reaction temperatures and pressures, are employed.

The reaction time is not a truly independent variable and is dependent to some extent on the nature of the halogenated olefin reactant and the other process variables under which the reaction is conducted. For example, when high temperatures and high pressures are employed, the reaction time is usually reduced. Similarly, low temperatures and low pressures usually require a longer reaction time. In most instances, the reaction is complete within from about two minutes to about 15 hours, and often with 30 minutes or even less.

When the reaction is carried out in liquid phase, agitation of the reaction mixture is efficaciously employed. Although not essential, efficient agitation usually affords a smooth reaction rate and tends to decrease the reaction time. For best results, when the process is carried out in vapor phase, the catalyst (preferably in a fine state of subdivision) is dispersed on an inert matrix. As stated above, the catalytic elements of this invention are the Group VIII metals of the second and third long periods of the Periodic Table. In other words, they are ruthenium, rhodium, palladinum, osmium, iridium, platinum.

The preferred catalysts employed in the process of this invention are the metals palladium, platinum, iridium, and rhodium, and mixtures of said metals.

It is preferred that the catalyst be in a fine state of subdivision. Metal turnings and finely divided metal powders can be employed. Colloidal dispersions of the catalyst in an inert liquid reaction medium are also applicable. Similarly, the metals and their salts can be dispersed and supported on an inert solid matrix such as charcoal, alumina, diatomaceous earth, bentonite, firebrick, kaolin, ground glass, silicon carbide, silica gel, and the like.

The reaction is carried out in the presence of a catalytic amount of one or more of the above catalysts; that is, from about 0.00015 to about 0.15 mole of the catalyst per mole of olefinic halide, but more preferably is in the range of from about 0.0015 to 0.15 mole of the catalyst per mole of the olefinic halide. If desired, larger amounts of the catalyst, say up to about 30 or more mole percent, can be employed. There is no real upper limit on the amount of the catalyst, but from an economic viewpoint it is preferred that the smallest amount of the catalyst which provides a reasonable rate of reaction be employed. The amount of the catalyst employed generally depends on the specific catalyst used, the olefinic halide reacted, and the conditions under which the reaction is carried out.

A wide variety of halogenated olefins can react with carbon monoxide according to the process of this invention. Thus, any halogenated olefin which (1) is stable under the reaction conditions employed, (2) contains a vinyl olefin radical C=C—X (wherein X is halogen), and (3) does not contain substituent groups which hinder or retard the process of this invention by undergoing competitive side reactions, are applicable. Preferred halogenated olefins which meet the above criteria have the formula:

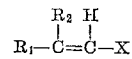

wherein X is a halogen and $R_1$ and $R_2$ are selected from the group consisting of hydrogen and univalent organic radicals having one to about 28 carbon atoms, said organic radicals being selected from the group consisting of alkyl, cycloalkyl, and aryl radicals, such that at least one of $R_1$ and $R_2$ is hydrogen and said halogenated olefin has up to about 30 carbon atoms.

Thus, olefinic chlorides, bromides, and iodides may be employed in the process of this invention, the olefinic chlorides being more highly preferred, and vinyl chloride being most highly preferred. It is preferred that the carbon to which the halogen atom is bonded have hydrogen bonded thereto and have no substituent groups. Furthermore, it is preferred that any non-hydrocarbon substituent on the halogenated olefin be at least one carbon atom removed from the halogen and that the non-hydrocarbon group does not enter into any reaction with any of the reactants used in this process or prevent the halogenated olefin from entering into the reaction of this process. Some of the non-limiting examples of the halogenated olefins applicable in the process of this invention are propenyl halides, eicosyl-1 halides, pentene-1 halides, tricosyl-1 halides, and β-halo styrenes.

From the above disclosure, it is evident that the process of this invention is substantially a reaction involving the olefinic group

(where X=halogen) and therefore, any halogenated olefin having such a group can be used in the process of this invention, as for example, isopropenyl halide.

The products of this invention are either solids or liquids at room temperature and can be isolated from the reaction mixture by any method known in the art. Thus, the products can be isolated by distillation, extraction, fractional crystallization, salting out, chromatography, and other similar methods.

From the above disclosure it is evident that the products of the process of this invention may be obtained in the form of a free carboxylic acid, an ester, or an amide when the reaction is carried out correspondingly in the presence of water, an alcohol, or an amine respectively. In many instances it is very convenient to isolate the products of this invention in the form of such derivatives which, if desired, may be converted to the acid halide, or other compounds, by conventional means.

The products of this invention, that is, carboxylic acids, esters, and amides, and the like, are well known compounds and they have the many utilities which are known for those compounds. Being unsaturated compounds, they undergo bromination or chlorination, or similarly they may be hydrobrominated by treatment with hydrobromic acid, or undergo other addition reactions. Since they are ethylenically unsaturated monomers, the products of this invention may be used in the preparation of a great variety of homopolymers and copolymers with a wide field of application.

It has been observed that acetylene acts as a promoter in the process of this invention. That is, acetylene promotes the preparation of unsaturated carboxylic acids and related compounds according to this process. In general, a promoter quantity of acetylene is about one-tenth of the amount of the catalyst. Thus, from about 0.00001 mole percent of acetylene can be employed, but usually larger amounts in the range of from about 0.001 to 0.5 mole percent are used. There is no critical upper limitation. However, for safety and economic reasons it is preferable that the smallest amount of acetylene necessary to promote the reaction be employed.

A by-product of the process of this invention is hydrogen chloride formed by decomposition of the vinyl chloride and/or the acrylyl chloride or hydrolysis of the acrylyl chloride. To cut down the possibility of corrosion caused by hydrogen chloride, a number of materials may be added to the reaction mixture, for example, calcium oxide, sodium carbonate, potassium hydroxide, or an alcohol. The best results, however, are obtained when an excess of an alcohol is used which reacts both with the acid chloride and hydrogen chloride.

The following non-limiting examples further illustrate the process of this invention. All parts are by weight unless otherwise indicated.

Example 1.—Reaction of vinyl chloride, carbon monoxide and palladium in ethanol

An autoclave was charged with 360 parts of ethanol and 3 parts of palladium. After purging the autoclave with carbon monoxide, 140 parts of vinyl chloride was added, and the clave was pressured to 1000 p.s.i. with carbon monoxide. Thereafter, the autoclave was heated to 270° C. After two hours, the pressure drop was 350 p.s.i. The clave was cooled, vented, discharged, and the contents filtered. The filtrate was diluted with 500 parts of cold water and sodium chloride was added until the water was saturated. This mixture was then extracted with two portions of ether, 290 parts each. The combined extracts were dried over magnesium sulphate and filtered. Some of the ether was removed by the use of an aspirator. The remaining liquid was washed twice with 300-part portions of saturated sodium chloride solution and then dried over magnesium sulphate.

Distillation of the resultant solution gave the following fractions: (1) 570 parts of a mixture of an ether and an ester, B.P. 32–38° C.; (2) 110 parts, B.P. 70–79° C.; (3) 21.9 parts of a mixture of acid and ester, B.P. 80° C. at 33–60 mm.; (4) 3.6 parts, B.P. 70–90° C. at 2 mm., which was discarded.

Fraction 1 was distilled through a helices packed column to removed ether. Fraction 2 was diluted with 150 parts of cyclohexane and the resultant mixture distilled through a helices packed column. Two fractions were collected. One contained ethanol-cyclohexane azeotrope which was dicarded, and the other contained excess cyclohexane and the product, which was retained. The residue from the distillation of Fraction 2 was combined with the residue of the first fraction and distilled through a helices packed column to give 30.6 parts of product, ethyl acrylate, B.P. 96–99° C. It was identified by infrared analysis and by refractive index. The cyclohexane fraction obtained in the distillation of Fraction 2 was diluted with ethanol and the ethanol-cyclohexane azeotrope was distilled and discarded. The residue was distilled to give an additional 8.1 parts of ethyl acrylate for a total of 38.7 parts of the product.

Fraction 3 was diluted with 35 parts of ether and washed with 75 parts of 20 percent sodium carbonate. The basic wash was acidified with concentrated hydrochloric acid and extracted with ether to yield crude acrylic acid. This was distilled to give 4.9 parts of pure acid, B.P. 139–140° C.

The unexpected presence of the acrylic acid in the product may be explained, without any intention of being limited to any theory, by hydrolysis of the acid chloride either in the autoclave or during the separation step.

Example 2.—Reaction of vinyl chloride, CO, palladium on charcoal in ethanol and cyclohexane A mixture of 25 parts of 5 percent palladium on charcoal, 120 parts of ethanol, and 280 parts of cyclohexane were charged to an autoclave. The system was purged with carbon monoxide, and 180 parts of vinyl chloride added to the autoclave which was then pressured with 1000 p.s.i. of carbon monoxide. The reaction mixture was stirred at 275° C. for two hours. A total of 600 p.s.i. of gas was consumed. The mixture was cooled slowly to 20° C. and the gases were vented. The resultant solution and solids were filtered. The residue was washed successively with dilute HCl, water and ether, then dried in vacuo. The filtrate was washed with 300 parts of 20 percent $Na_2CO_3$. Acidification and extraction of the basic layer yielded 35 parts of crude acid. Distillation of this acid yielded 25.5 parts of acrylic acid, B.P. 139–140° C. The neutral cyclohexane layer was dried over $MgSO_4$ and diluted with 140 parts of ethanol. The cyclohexane-ethanol azeotrope was separated by distillation as in the previous example, leaving a residue which, on distillation, yielded 32.6 parts of the product, ethyl acrylate, B.P. 98–99° C.

Example 3.—Reaction of vinyl chloride and CO at 250° C.

An autoclave was charged with 15 parts of 5 percent palladium on charcoal, 150 parts of ethanol, 145 parts of ethyl ether, and 220 parts of benzene. After flushing with carbon monoxide, 132 parts of vinyl chloride was added and the pressure brought up to 2000 p.s.i. with carbon monoxide. The reaction mixture was heated to 225° C. and carbon monoxide added to bring the pressure up to 7000 p.s.i. After one hour, the pressure was 6,750 p.s.i. The vessel was heated to 250° C. and carbon monoxide added to increase the pressure to 9,840 p.s.i. After two hours, the pressure was 9,360 p.s.i. The resultant mixture was cooled and distilled. Twelve parts of ethyl acrylate was obtained.

Example 4.—Reaction of vinyl chloride and CO with platinum on carbon catalyst

A mixture of 20 parts of 5 percent platinum on charcoal, 80 parts of ethanol, and 350 parts of benzene was charged into an autoclave. After purging the vessel with carbon monoxide, 200 parts of vinyl chloride was added and the autoclave was pressured with 2,500 p.s.i. of carbon monoxide and heated at 275° C. for 12 hours. The clave was then vented and discharged. The reaction mixture was filtered and distilled. First, the low boiling materials (ether, ethyl chloride, vinyl chloride) were removed. Then ethanol and benzene were removed and finally three more fractions, B.P. 80–93° C., 8.85 parts; B.P. 93–97° C., 5.2 parts; and B.P. 97–132° C., 2.8 parts, were obtained. The infrared spectra of these fractions indicated that they contained benzene and ethyl acrylate, ethyl acrylate, and ethyl acrylate and acrylic acid, respectively.

Example 5.—Reaction of vinyl chloride, CO, ethanol and recovered palladium

A mixture of 265 parts of benzene, 250 parts of ethanol, and 15 parts of palladium on charcoal (recovered from another preparation of ethyl acrylate by this process) was charged into an autoclave which was purged with carbon monoxide. After the addition of 170 parts of vinyl chloride, the autoclave was pressured to 1,500 p.s.i. of carbon monoxide. The resultant reaction mixture was heated to 275° C. and stirred for one hour. The reaction mixture was then cooled quickly to 32° C. The gases were vented and the resultant reaction mixture was collected. Following the procedure of Example 5 for isolating the product, 22 parts of ethyl acrylate was obtained.

Example 6.—Reaction of vinyl chloride, CO and ethanol with palladium on charcoal at low pressure A mixture of 250 parts of ethanol, 265 parts of benzene, and 15 parts of 5 percent palladium on charcoal was charged into an autoclave. After purging the clave with carbon monoxide, 110 parts of vinyl chloride was added and the vessel was pressured to 50 p.s.i. of carbon monoxide. The reaction mixture was stirred and heated to about 275° C. After about 30 minutes an additional 200 p.s.i. of carbon monoxide was then added and heating was continued for one hour. Thereafter, the mixture was cooled quickly to 35° C. and the gases were vented. Following the procedure of Example 5 for isolating the product, 22 parts of ethyl acrylate (B.P. 97–99° C.) was obtained.

Example 7.—Reaction of vinyl chloride and carbon monoxide

An autoclave was charged with 200 parts ethanol, 300 parts of benzene, 30 parts of 5 percent palladium on charcoal, and 5 parts of p-tert-butyl catechol. After flushing with carbon monoxide, the clave was pressured to 1000 p.s.i. with carbon monoxide and then heated to 274° C. The pressure was then increased to 2,675 p.s.i. of carbon monoxide. To the mixture was added 100 parts of vinyl chloride. After the addition of vinyl chloride, the temperature was 277° C. and the pressure was 2,890 p.s.i. After 15 minutes the temperature was 276.5° C. and the pressure was 2,620 p.s.i. At this point, the autoclave was cooled.

Dry Ice traps were connected to the clave, and the clave was discharged. The clave contents were heated and the volatiles collected in the traps and discarded. Distillation of the remaining material through a packed column gave 485 parts of mixed ethanol and benzene. A fraction boiling at 82–90° C. yielded 20 parts of liquid that was 45 percent ethyl acrylate and a fraction boiling at 90–100° C. yielded 29 parts of ethyl acrylate. The residue was distilled. The distillate was then fractionated through a spinning band column. Fraction 1, B.P. 77–97° C. was less than 1 part and was discarded. Fraction 2, B.P. 97–102° C. yielded 6.6 parts and was ethyl acrylate. Fraction 3, B.P. 102–121° C. yielded 0.5 part and was mostly ethyl acrylate. A total of 45 parts of the product was collected.

Similar results were obtained when the procedure of Example 8 was repeated except that the initial pressure of carbon monoxide was 100 p.s.i. instead of 1000 p.s.i.

Example 8.—Reaction of vinyl chloride, CO, ethanol and palladium in toluene

An autoclave was charged with 300 parts of toluene, 200 parts of ethanol, 30 parts of 5 percent palladium on charcoal, and 5 parts of p-tert-butyl catechol. After purging the autoclave with carbon monoxide, the pressure was increased to 1000 p.s.i. of carbon monoxide and the mixture was stirred at 275° C. A total of 100 parts of vinyl chloride was pumped in and the mixture was allowed to react for 30 minutes. A total uptake of 430 p.s.i. was recorded. The reaction mixture was cooled quickly to 30° C. and the usual venting and discharging procedure was used. Following the procedure of Example 5, 66 parts of trapped volatiles were obtained. Mass spectrographic analysis indicated about 20 percent vinyl chloride. Distillation of the residue yielded 66.7 parts of a fraction containing 50.7 parts of ethyl acrylate.

Example 9.—Reaction of vinyl chloride, CO, ethanol and palladium on silica gel in toluene A mixture of 300 parts of toluene, 200 parts of ethanol, 30 parts of 5 percent palladium dispersed on silica gel powder and 5 parts of p-tert-butyl catechol was charged into an autoclave. After purging, the pressure in the clave was raised to 1000 p.s.i. of carbon monoxide and the mixture was then stirred and heated to 275° C. A total of 100 parts of vinyl chloride was pumped in and the mixture was allowed to react for 30 minutes. An uptake of 100 p.s.i. was observed. Distillation of the resultant liquid fraction yielded 13.5 parts of ethyl acrylate product.

Example 10.—Reaction of vinyl chloride and CO with calcium oxide present

An autoclave was charged with 450 parts of benzene, 80 parts of ethanol, 15 parts of 5 percent palladium on charcoal, and 60 parts of calcium oxide. It was flushed with carbon monoxide, and 100 parts of vinyl chloride was added. The clave was pressured to 1100 p.s.i. of carbon monoxide and heated to 275° C. After two hours the clave was cooled, vented and discharged. The resultant liquid was filtered and distilled. After the removal of the low-boiling fraction and the solvent by distillation through a helices-packed column, the remaining liquid was distilled. Fractions boiling from 90–108° C. were collected and combined yielding a total of 77 parts of the material. Infrared analysis of the combined material showed that it was principally composed of ethyl acrylate. Hydrogenation of a small amount of the material indicated it was 88 percent ethyl acrylate.

Example 11.—Reaction of vinyl chloride and CO with acetylene promoter

An autoclave was charged with 200 parts of ethanol, 300 parts of toluene, 30 parts of 5 percent palladium on charcoal, and 5 parts of p-tert-butyl catechol. After flushing thoroughly with carbon monoxide, a 50 p.s.i. charge of carbon monoxide was added and then acetylene was added to a pressure of 100 p.s.i. The pressure was raised to 1000 p.s.i. with carbon monoxide and the reaction mixture was heated to 275° C. At 273° C. and 2,475 p.s.i., 100 parts of vinyl chloride was added. This brought the pressure to 2,820 p.s.i. at 278° C. In 23 minutes the pressure dropped to 2,250 p.s.i. at 275° C. After seven more minutes with no pressure drop, the autoclave was cooled. It was vented through Dry Ice traps and the volatiles collected by heating the reaction mass.

Benzene was added to the reaction mass and the benzene-ethanol azeotrope was distilled. The ethyl acrylate was then distilled and several fractions containing some acrylate were obtained. Vapor phase chromatography analysis indicated that the product contained 51 parts of ethyl acrylate.

The reactions listed in the following table further illustrate the process of this invention.

When 1-chloroheptene-1, 1-chlorooctene-1, 1-chlorononene-1, 1-chloroundecene-1, 1-chlorotridecene-1, 1-chloropentadecene-1, 1-chloroeicosene-1, 1-chloropentacosene-1, and 1-chlorotricontene-1 are reacted according to the procedure of Examples 2, 4, 5, 7 and 10, the products are ethyl 1-octenoate, ethyl 1-nonenoate, ethyl 1-decenoate, ethyl 1-dodecenoate, ethyl tetradecenoate, ethyl 1-hexadecenoate, ethyl 1-heneicosenoate, ethyl 1-hexacosenoate, and ethyl 1-hentriacontenoate, respectively.

carbon monoxide, under pressure, with a halogenated olefin having the formula:

$$R_1-\overset{R_2}{\underset{|}{C}}=\overset{H}{\underset{|}{C}}-X$$

wherein X is a halogen, and $R_1$ and $R_2$ are independently selected from the group consisting of hydrogen and univalent organic radicals having one to about six carbon atoms, said organic radicals being selected from the group

TABLE

| Ex. No. | Halogenated Olefin | Parts of Catalyst | Solvent | Amount in Parts | Initial CO Pressure, p.s.i. | Temperature, °C. | Reaction Time | Product |
|---|---|---|---|---|---|---|---|---|
| 12 | Vinyl Chloride, 100 parts | 5% Pt/C, 20 parts | EtOH / Benzene | 200 / 300 | 1,000 | 285 | 3 hrs | Ethyl acrylate, 15 parts. |
| 13 | do | 5% Pd/C, 20 parts | EtOH / Benzene | 200 / 300 | 1,000 | 300 | 10 min | Ethyl acrylate, 21 parts. |
| 14 | Chloro-1-hexene, 150 parts | do | EtOH / Benzene | 200 / 300 | 1,000 | 275 | ½ hr | Ethyl ester of 2-heptenoate, 50 parts. |
| 15 | α-Chlorostyrene, 150 parts | do | EtOH / Benzene | 200 / 300 | 1,000 | 275 | 1 hr | Ethyl cinnamate, 20 parts. |
| 16 | Vinyl Chloride, 100 parts | 5% Ir/C, 20 parts | EtOH / Benzene | 200 / 300 | 1,000 | 275 | 2.5 hrs | Ethyl acrylate, 11 parts. |
| 17 | do | 5% Rh/C, 20 parts | EtOH / Benzene | 200 / 300 | 1,000 | 275 | 2 hrs | Ethyl acrylate, 9 parts. |

Having fully described the novel process of this invention and the utilities of the products thereby produced, it is desired that this invention be limited only within the lawful scope of the appended claims.

We claim:

1. A catalytic process for the preparation of unsaturated carboxylic acids and unsaturated carboxylic acid esters, comprising reacting carbon monoxide, under pressure, with a halogenated olefin having the formula:

$$R_1-\overset{R_2}{\underset{|}{C}}=\overset{H}{\underset{|}{C}}-X$$

wherein X is a halogen and $R_1$ and $R_2$ are selected from the group consisting of hydrogen, alkyl groups having from 1 to 28 carbon atoms and the phenyl group such that at least one of $R_1$ and $R_2$ is hydrogen and said halogenated olefin has up to about 30 carbon atoms; and a compound selected from the class consisting of water, $C_2$–$C_4$ paraffinic alcohols, $C_6$–$C_{10}$ aromatic alcohols and $C_5$–$C_6$ cycloparaffinic alcohols; in the presence of from about 0.00015 to about 0.15 mole of catalyst per mole of said halogenated olefin, said catalyst being selected from the group consisting of the metals palladium, platinum, iridium and rhodium, and mixtures thereof; at a temperature of from 250° C. to the decomposition temperature of said halogenated olefin, and at a pressure of from about 50 p.s.i. to about 10,000 p.s.i.

2. The process of claim 1 wherein X is chlorine.

3. The process of claim 1 wherein the halogenated olefin is vinyl chloride.

4. The process of claim 1 wherein the catalyst is palladium.

5. The process of claim 1 carried out in the presence of acetylene as a promoter.

6. The process of claim 1 wherein said pressure is within the range of from about 600 p.s.i. to about 7,000 p.s.i.

7. The process of claim 5 wherein said pressure is within the range of from about 2000 p.s.i. to about 5000 p.s.i.

8. A catalytic process for the preparation of an unsaturated carboxylic acid, said process comprising reacting carbon monoxide, under pressure, with a halogenated olefin having the formula:

$$R_1-\overset{R_2}{\underset{|}{C}}=\overset{H}{\underset{|}{C}}-X$$

wherein X is a halogen, and $R_1$ and $R_2$ are independently selected from the group consisting of hydrogen and univalent organic radicals having one to about six carbon atoms, said organic radicals being selected from the group consisting of alkyl, cycloalkyl, and aryl radicals, such that at least one of $R_1$ and $R_2$ is hydrogen; said process being carried out in the presence of water and in the presence of a catalytic quantity of a catalyst selected from the group consisting of the metals palladium, platinum, iridium, and rhodium, and mixtures thereof, said step being carried out at a temperature of from about 260° C. to about 290° C. and at pressure of from about 600 p.s.i. to about 7,000 p.s.i.

9. A catalytic process for the preparation of an ester of an unsaturated carboxylic acid, said process comprising reacting carbon monoxide under pressure with a halogenated olefin having the formula:

$$R_1-\overset{R_2}{\underset{|}{C}}=\overset{H}{\underset{|}{C}}-X$$

wherein X is a halogen and $R_1$ and $R_2$ are independently selected from the group consisting of hydrogen and univalent organic radicals having one to about six carbon atoms, said organic radicals being selected from the group consisting of alkyl, cycloalkyl, and aryl radicals, such that at least one of $R_1$ and $R_2$ is hydrogen; said process being carried out in at least a stoichiometric quantity of an alcohol selected from the group consisting of $C_2$–$C_4$ paraffinic alcohols, $C_6$–$C_{10}$ aromatic alcohols, and $C_5$–$C_6$ cycloparaffinic alcohols, and in the presence of from 0.00015 to about 0.15 mole of catalyst per mole of said olefin, said catalyst being supported on an inert matrix, and said catalyst being selected from the group consisting of the metals palladium, platinum, iridium, and rhodium, and mixtures thereof; said process comprising the steps of increasing the pressure of said carbon monoxide to about 100 p.s.i. while the temperature of the reaction mixture is within the range of from about room temperature to about 100° C., raising the temperature to within the range of from about 260° C. to about 290° C., and increasing the pressure of said carbon monoxide to within the range of from about 600 p.s.i. to about 7,000 p.s.i.

10. The process of claim 9 wherein the halogenated olefin is vinyl chloride and said catalyst is palladium.

11. The process of claim 10 wherein said alcohol is ethyl alcohol, said catalyst is palladium or charcoal, said carbon monoxide pressure is at least 100 p.s.i. before the reaction temperature is attained, and thereafter, the pressure being raised to within the range of from about 2,000 p.s.i. to about 5,000 p.s.i. and said reaction temperature is in the range of from about 270° C. to 290° C.

(References on following page)

References Cited

UNITED STATES PATENTS

| | | | |
|---|---|---|---|
| 3,309,403 | 3/1967 | Mador et al. | 260—544 |
| 3,338,961 | 8/1967 | Closson et al. | 260—486 XR |

FOREIGN PATENTS 3,912,916  7/1964  Japan.

OTHER REFERENCES

Tsuji et al.: Part III, Tetrahedron Letters, pp. 1811–1813, No. 26 (November 1963).

Tsutsumi et al.: "From Summaries of Lectures Presented in the 16th Annual Meeting of Chemical Society of Japan," p. 485, Mar. 31, 1963.

LORRAINE A. WEINBERGER, Primary Examiner

ALBERT P. HALLUIN, Assistant Examiner

U.S. Cl. X.R.

260—410.9, 413, 468, 476, 479, 514, 515, 526, 544, 557, 558, 561

PO-1050
(5/69)

UNITED STATES PATENT OFFICE
CERTIFICATE OF CORRECTION

Patent No. 3,457,299          Dated July 22, 1969

Inventor(s) Rex D. Closson and Kryn G. Ihrman

It is certified that error appears in the above-identified patent and that said Letters Patent are hereby corrected as shown below:

Claim 9, Column 10, line 43, the formula reading $_1-C=C-X$      should read    $R_1-C=C-X$ Claim 11, Column 10, line 68, "or" should be -- on --

SIGNED AND
SEALED
FEB 17 1970

(SEAL)
Attest:

Edward M. Fletcher, Jr.
Attesting Officer

WILLIAM E. SCHUYLER, JR.
Commissioner of Patents